J. M. LAWRENCE.
COOKING RECEPTACLE.
APPLICATION FILED NOV. 5, 1920.

1,385,459.

Patented July 26, 1921.

INVENTOR
Jay M. Lawrence,
By Bradbury & Cornell
ATTORNEYS.

UNITED STATES PATENT OFFICE.

JAY M. LAWRENCE, OF ST. PAUL, MINNESOTA.

COOKING-RECEPTACLE.

1,385,459.	Specification of Letters Patent.	Patented July 26, 1921.

Application filed November 5, 1920. Serial No. 422,029.

*To all whom it may concern:*

Be it known that I, JAY M. LAWRENCE, a citizen of the United States, residing at St. Paul, in the county of Ramsey and State of Minnesota, have invented a new and useful Cooking-Receptacle, of which the following is a specification.

My invention relates to improvements in cooking receptacles and more particularly to means for retaining the cover on the body and which will permit limited play of the cover when the receptacle is tilted to drain liquid off of the contents of the receptacle, without holding the cover by hand.

Further, my invention is adapted to limit the movement of the bail of the receptacle so that it will not move from substantially upright position in one direction when the receptacle is tilted for draining purposes.

To these ends my invention comprises improved features of construction and combination of parts as will hereinafter be more particularly described and claimed and the advantages thereof pointed out.

Figure 1:
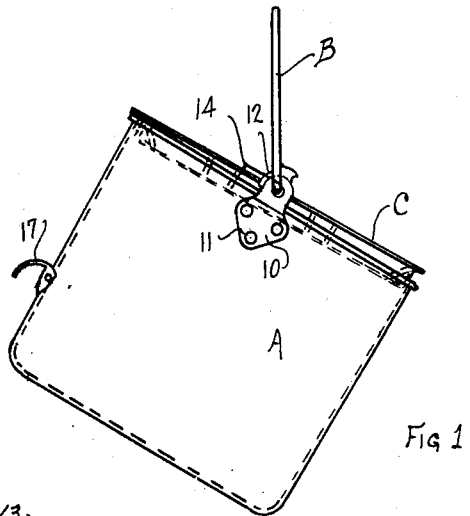
Figure 3:
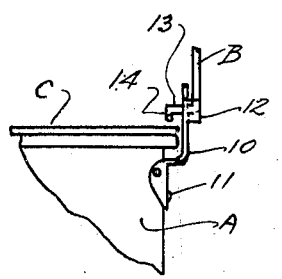
Figure 2:
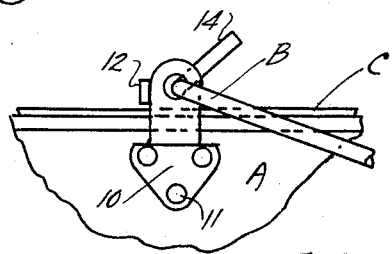
Figure 4:
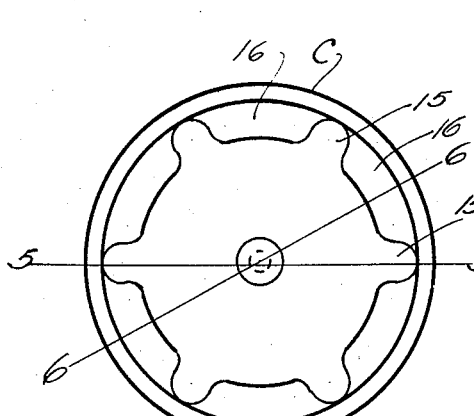
Figure 5:
Figure 6:
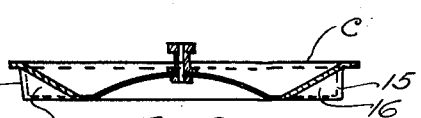

In the accompanying drawing, forming part of this specification, Figure 1 is a side elevation of my invention; Fig. 2 is a detail view taken when the bail is turned down; Fig. 3 is another detail view when looking endwise toward the portion illustrated in Fig. 2; Fig. 4 is a top plan view of the cover; Fig. 5 is a section taken on the line 5—5 of Fig. 4; and Fig. 6 is a section taken on the line 6—6 of Fig. 4.

In the drawing A indicates the body of a receptacle, such as is adapted to be used as a culinary cooking utensil, and B the bail which is hinged on the body by the use of bail ears 10. The flanges of these bail ears are secured to the body by rivets 11 or any other suitable means in the usual manner. One or both of the bail ears is formed with a stop or abutment 12 which resembles a lug on the side edge integral with and bent outwardly at an angle to the bail ear. This stop is positioned in the path of an end portion of the bail so as to obstruct swinging movement of the bail beyond a predetermined angle when the bail is in outstanding position. The end of the bail is bent to form a pivot portion 13 which is movably seated in the bail ear and that portion of the bail ear in which the bail is seated is offset outwardly from the body to escape the rim of the body. The extremity of the bail at the end of the pivot portion is formed with a cover holding shoulder 14 which coöperates with the cover C.

The cover C resembles a circular plate formed with obstruction shoulders 15 which are spaced apart circumferentially of the plate to provide pouring channels 16 through which liquid in the receptacle may pass freely while the cover is being held by the shoulders 15 against the inner wall of the body from sliding off of the receptacle. The height of the shoulders 15 permits limited tilting movement of the cover upwardly while the shoulders 15 prevent the cover from sliding. The shoulders 15 nest closely but freely within the mouth of the body and permits the rim of the cover to normally close the mouth. The cover holder 14 is positioned on the bail so that when the bail strikes the stop 12, it will permit only limited tilting of the cover upwardly into the open position shown in Fig. 1, but assist the shoulders or obstruction 15 in preventing the cover from sliding off of the body. The cover may be placed on the top of the body when the bail is turned down without regard to its circumferential position. When it is desired to drain liquid off of the contents of the receptacle the bail B is turned up into the position shown in Fig. 1. The bail and the handle 17 are then grasped and the receptacle tilted, the cover meanwhile being forced out at its lower portion by the contents of the receptacle, but prevented from being entirely displaced by the stop 14 which limits the movement of the cover. Thus the cover can be very easily placed on the body without having to adjust it circumferentially and the receptacle tilted and the contents drained without having to hold the cover by hand and without the cover sliding out of place. The novel structure may be duplicated on the opposite sides of the receptacle and on the bail ears and opposite ends of the bail, or only a single structure employed as preferred.

Having described my invention, what I claim as new and desire to secure by Letters Patent is:

1. A receptacle, comprising a body, a cover on said body having an obstruction on its lower side in spaced relation to the side of the body adapted to limit side movement of the cover and prevent the cover from sliding off of the body but permitting the cover to lift freely, and a bail, said body having a hinge connection provided with a stop and said bail being tiltingly secured to said body in the path of said stop by said hinge connection and limited by said stop in its swinging movement when projecting upwardly and said bail being formed with a cover holder adjoining said hinge connection, adapted to engage and prevent the removal of the cover from the body when the bail engages said stop, but permitting limited tilting movement of the cover on the body to provide pouring space between the rim of the body and the rim of the cover.

2. A receptacle, comprising a body, a cover on said body having obstructions spaced apart on its lower side to provide pouring spaces and adapted to nest freely in the open end of the receptacle, to limit side movement of the cover and prevent the cover from sliding off of the body, a bail ear on said body having a stop and a bail hinged in said bail ear having a cover engagement limiting the upward movement of the cover and permitting the cover to tilt open when the body is tilted in the pouring operation, said stop being positioned in the path of the bail to obstruct the movement of the bail and cause the bail to coöperate with said obstructions in preventing the cover from being entirely removed from the body.

In testimony whereof, I have signed my name to this specification.

JAY M. LAWRENCE.